(12) United States Patent
Hanson et al.

(10) Patent No.: US 12,296,367 B2
(45) Date of Patent: May 13, 2025

(54) METHOD FOR HANDLING COMPONENTS OF A SHEET EXTRUSION SYSTEM

(71) Applicant: Processing Technologies International, LLC, Aurora, IL (US)

(72) Inventors: Dana R. Hanson, St. Charles, IL (US); Ryan E. Leopold, Aurora, IL (US)

(73) Assignee: Processing Technologies International, LLC, Aurora, IL (US)

( * ) Notice: Subject to any disclaimer, the term of this patent is extended or adjusted under 35 U.S.C. 154(b) by 65 days.

(21) Appl. No.: 17/899,906

(22) Filed: Aug. 31, 2022

(65) Prior Publication Data

US 2024/0066577 A1 Feb. 29, 2024

(51) Int. Cl.
| | | |
|---|---|---|
| *B23P 6/00* | (2006.01) | |
| *B21C 23/06* | (2006.01) | |
| *B21C 33/00* | (2006.01) | |

(52) U.S. Cl.
CPC .............. *B21C 33/00* (2013.01); *B21C 23/06* (2013.01); *B23P 6/00* (2013.01)

(58) Field of Classification Search
CPC ......... Y10T 29/49718; Y10T 29/49721; Y10T 29/49723; Y10T 29/4973; Y10T 29/49732; B21C 33/00; B21C 23/06; B23P 6/00; B29C 48/265; B29C 48/92; B29C 48/08; B29C 48/2562; B29C 48/266; B29C 48/355
USPC ... 29/281.1, 402.01, 402.03, 402.04, 402.08, 29/402.09; 269/17
See application file for complete search history.

(56) References Cited

U.S. PATENT DOCUMENTS

| | | | | |
|---|---|---|---|---|
| 4,463,937 A | * | 8/1984 | Celette ..................... | B21D 1/14 269/61 |
| 4,705,264 A | * | 11/1987 | Hawkins ................. | B66C 23/48 269/47 |
| 5,707,450 A | * | 1/1998 | Thompson .......... | B05B 13/0285 118/500 |
| 7,090,210 B2 | * | 8/2006 | Lawrence ................. | B62B 1/12 29/559 |
| 2016/0176003 A1 | * | 6/2016 | Reckevícius ......... | B25B 11/002 29/592 |

* cited by examiner

*Primary Examiner* — Sarang Afzali
*Assistant Examiner* — Darrell C Ford
(74) *Attorney, Agent, or Firm* — Wood, Phillips, Katz, Clark & Mortimer

(57) ABSTRACT

A method of handling components for a sheet extrusion system including the steps of: obtaining a carriage configured to support different components each making up a part of a sheet extrusion system; placing a first of the different components in a supported staging position on the carriage; and performing an operation on the first of the different components in the supported staging position to at least one of: a) transport the first of the different components; b) perform a maintenance step on the first of the different components; c) repair the first of the different components; or d) set the first of the different components up for installation. The method further includes the steps of: separating the first of the different components from the supported staging position on the carriage; and reconfiguring the carriage to maintain a second of the different components, that is different in configuration than the first of the different components, in a supported staging position on the carriage.

27 Claims, 14 Drawing Sheets

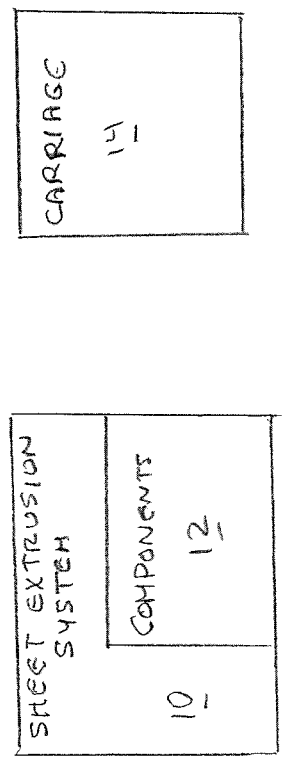
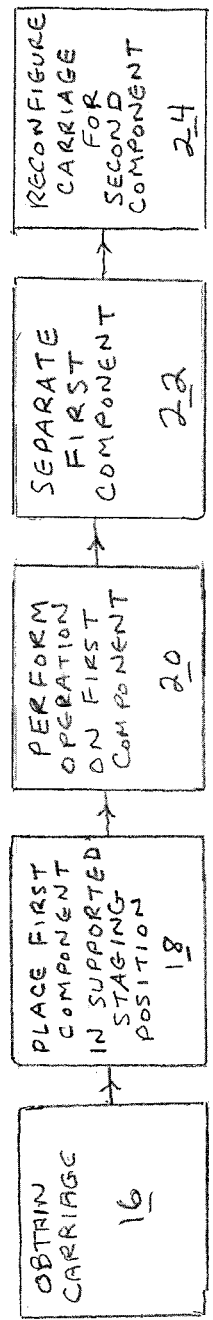

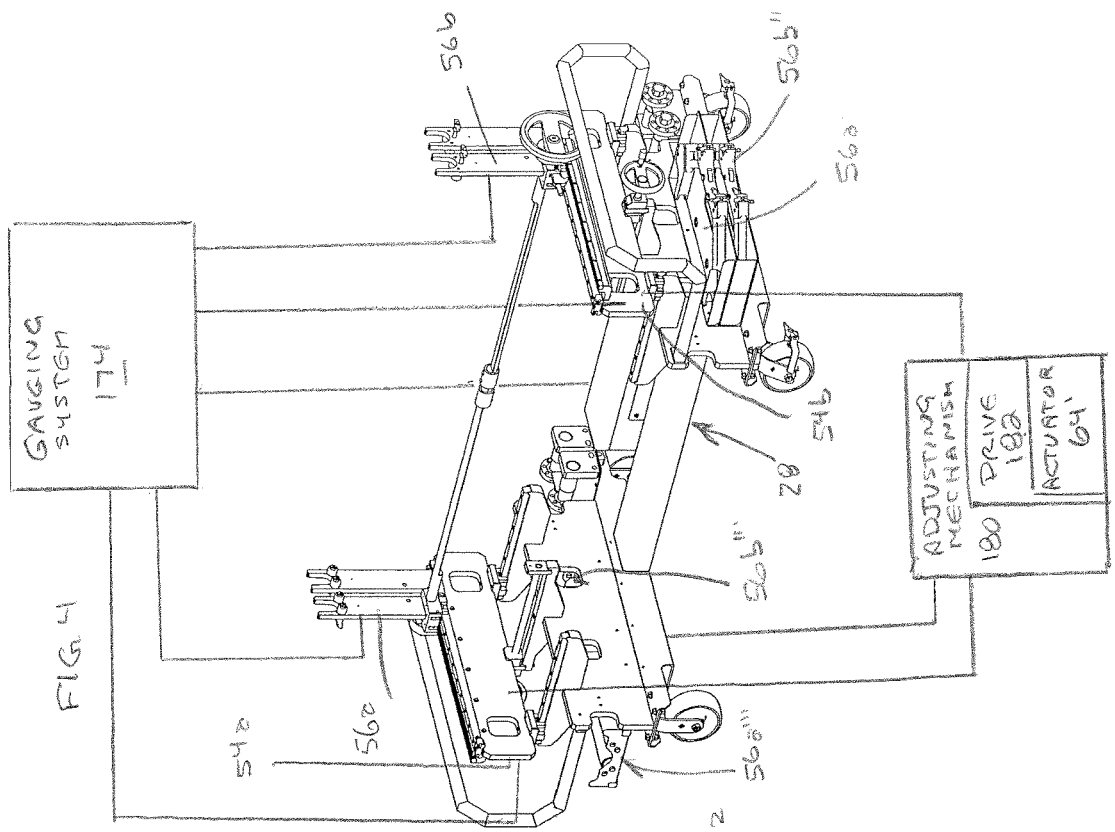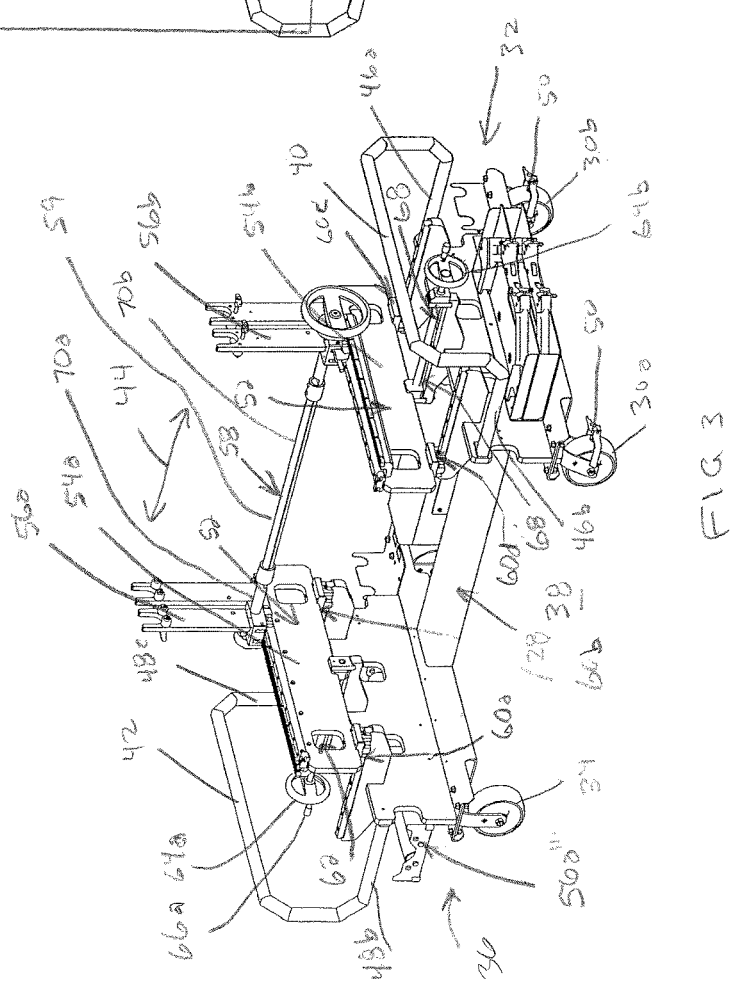

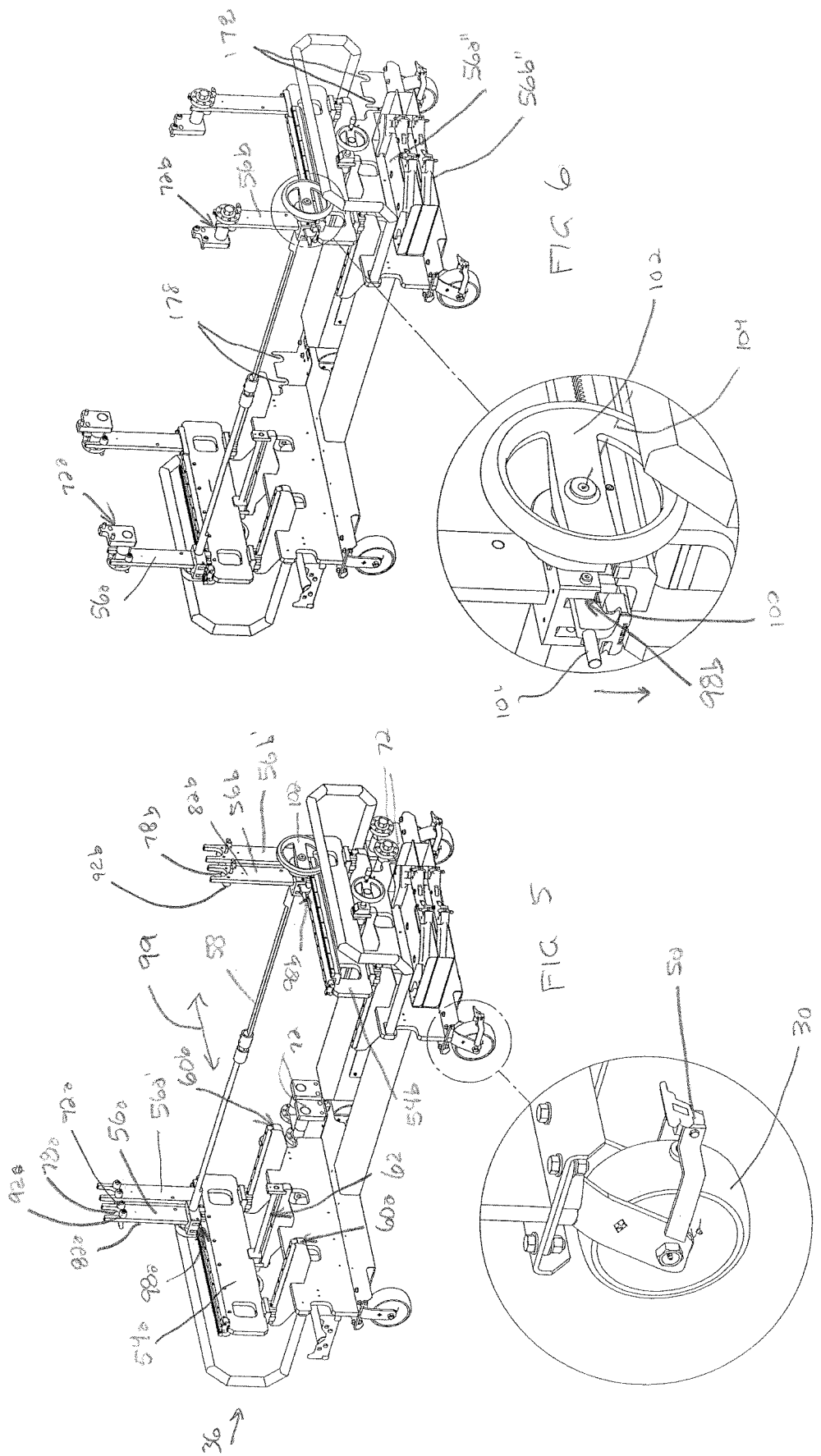

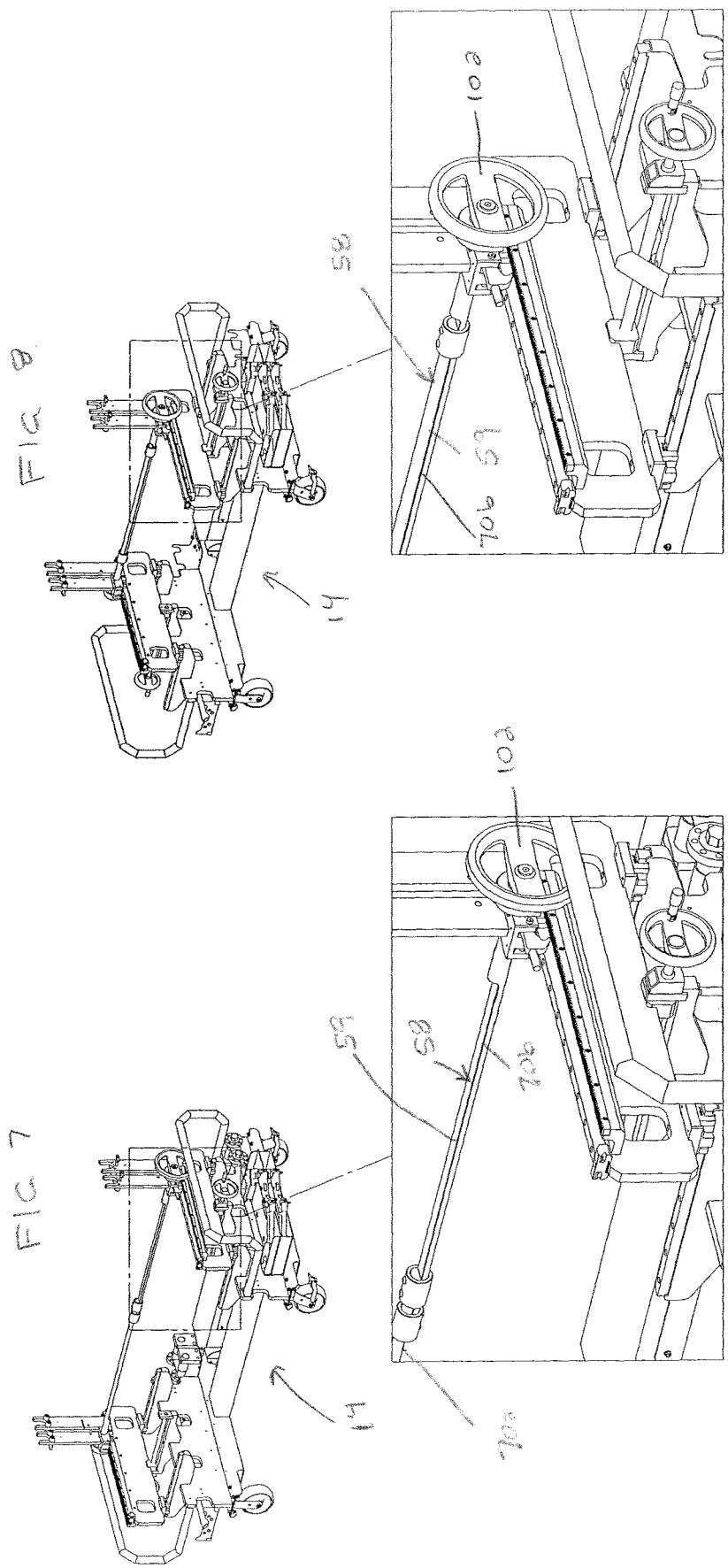

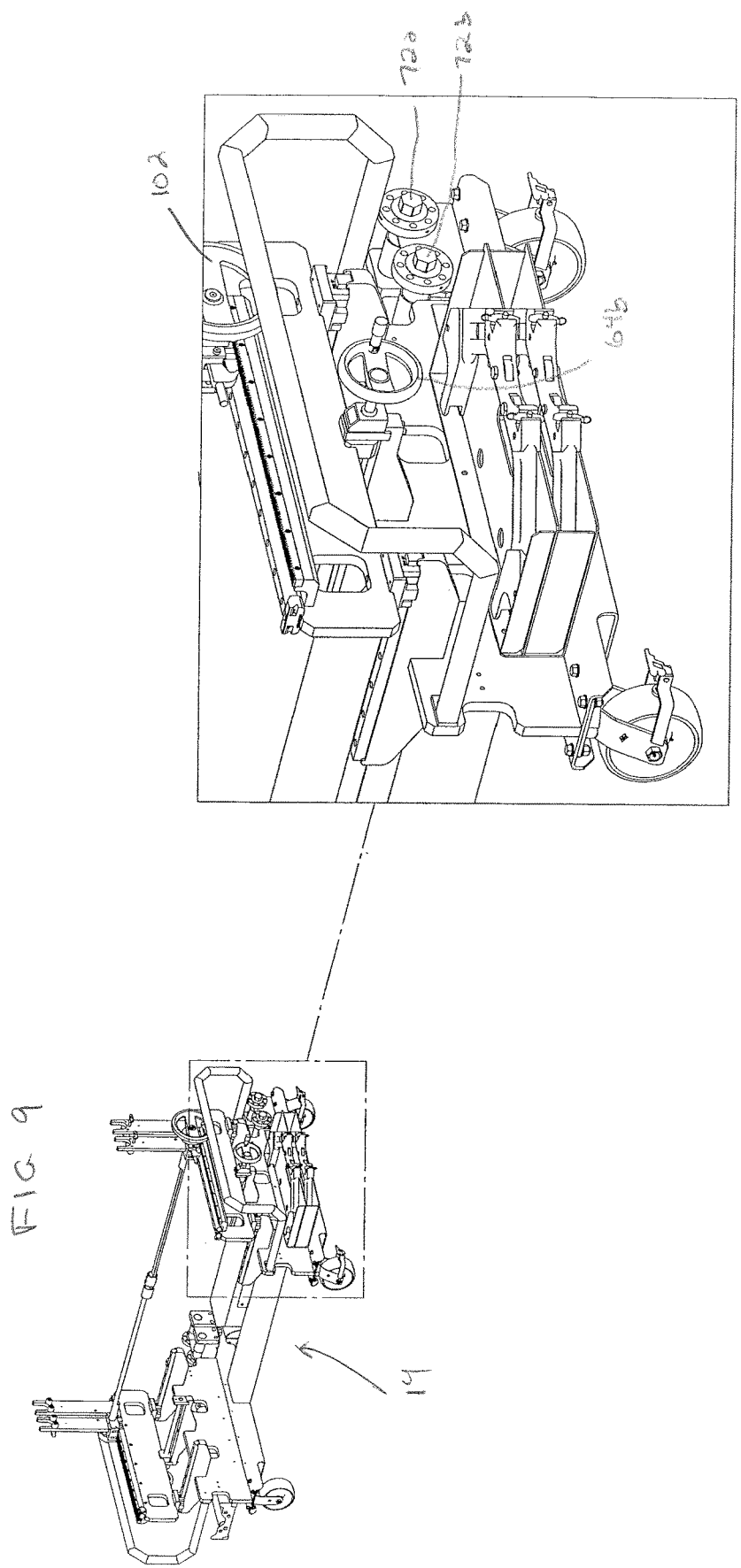

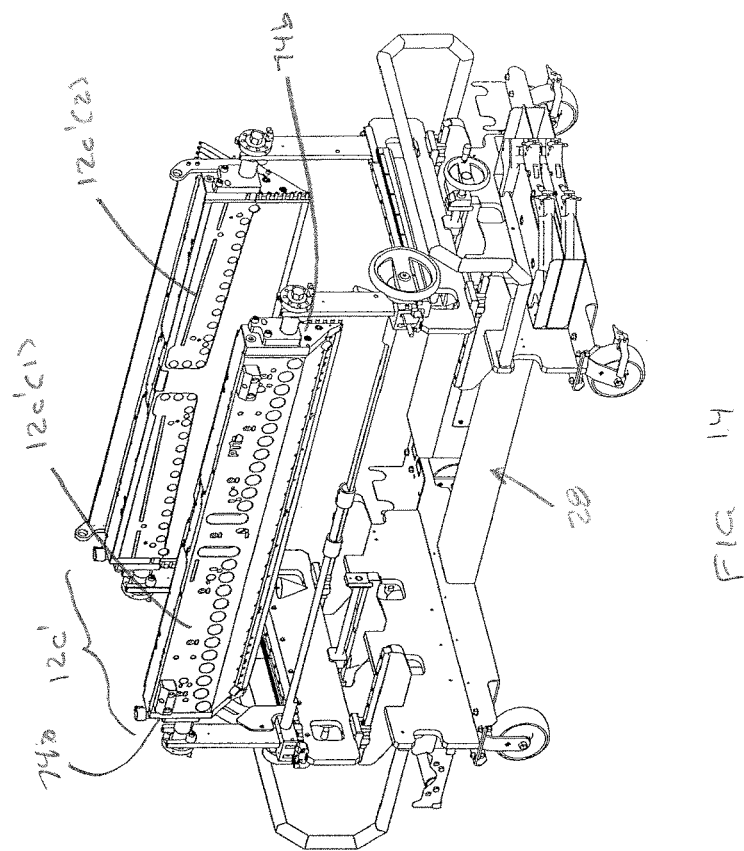
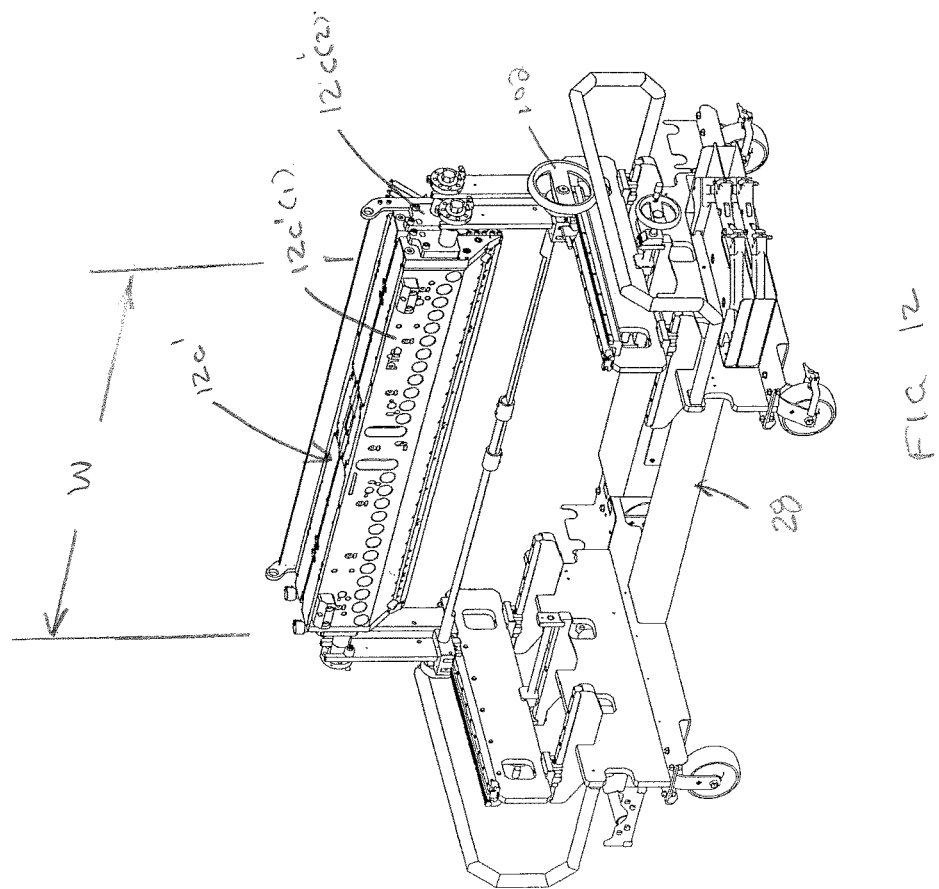

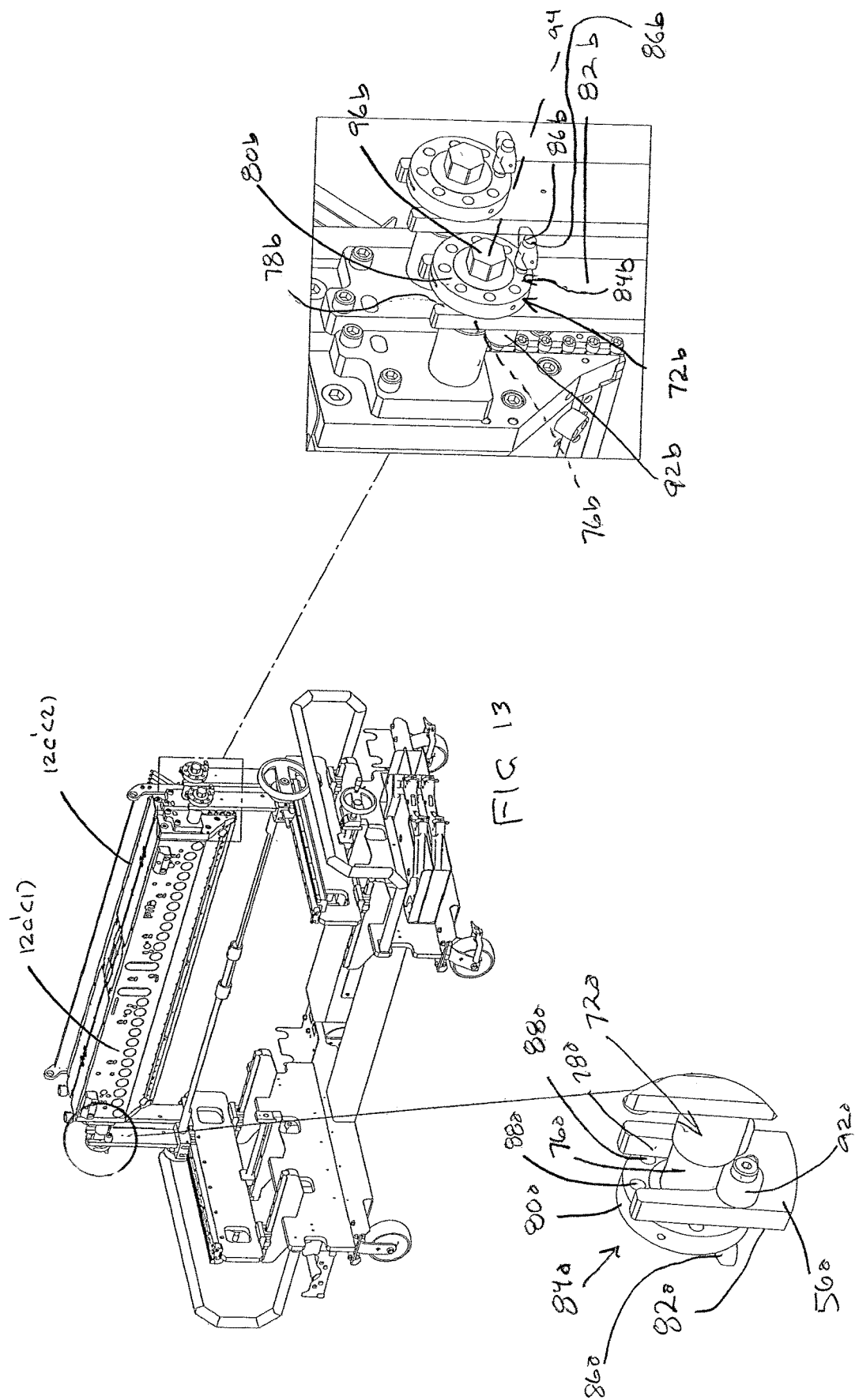

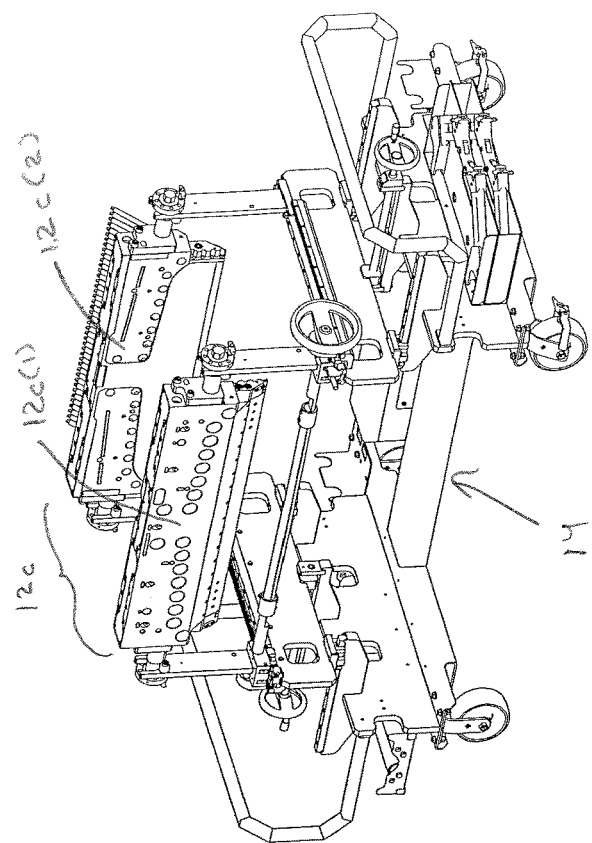
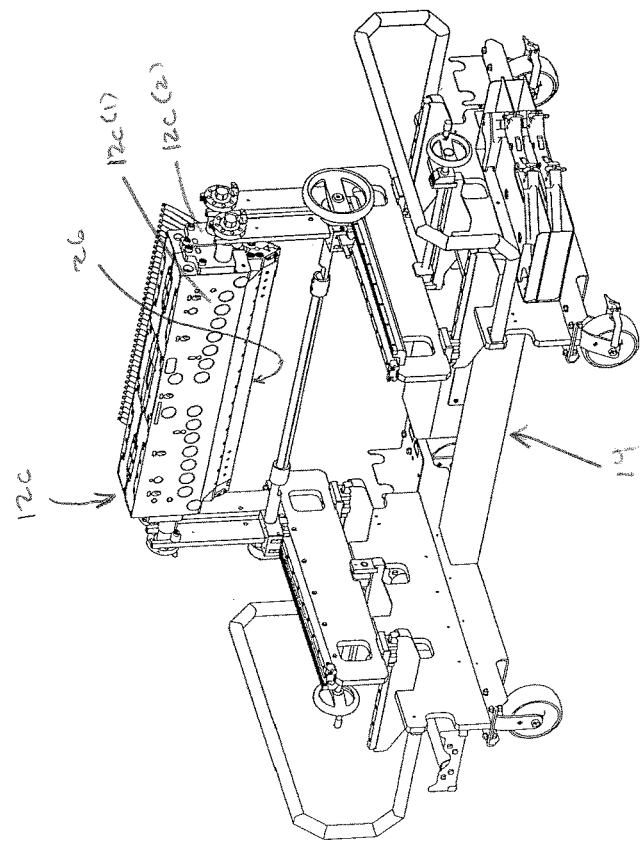

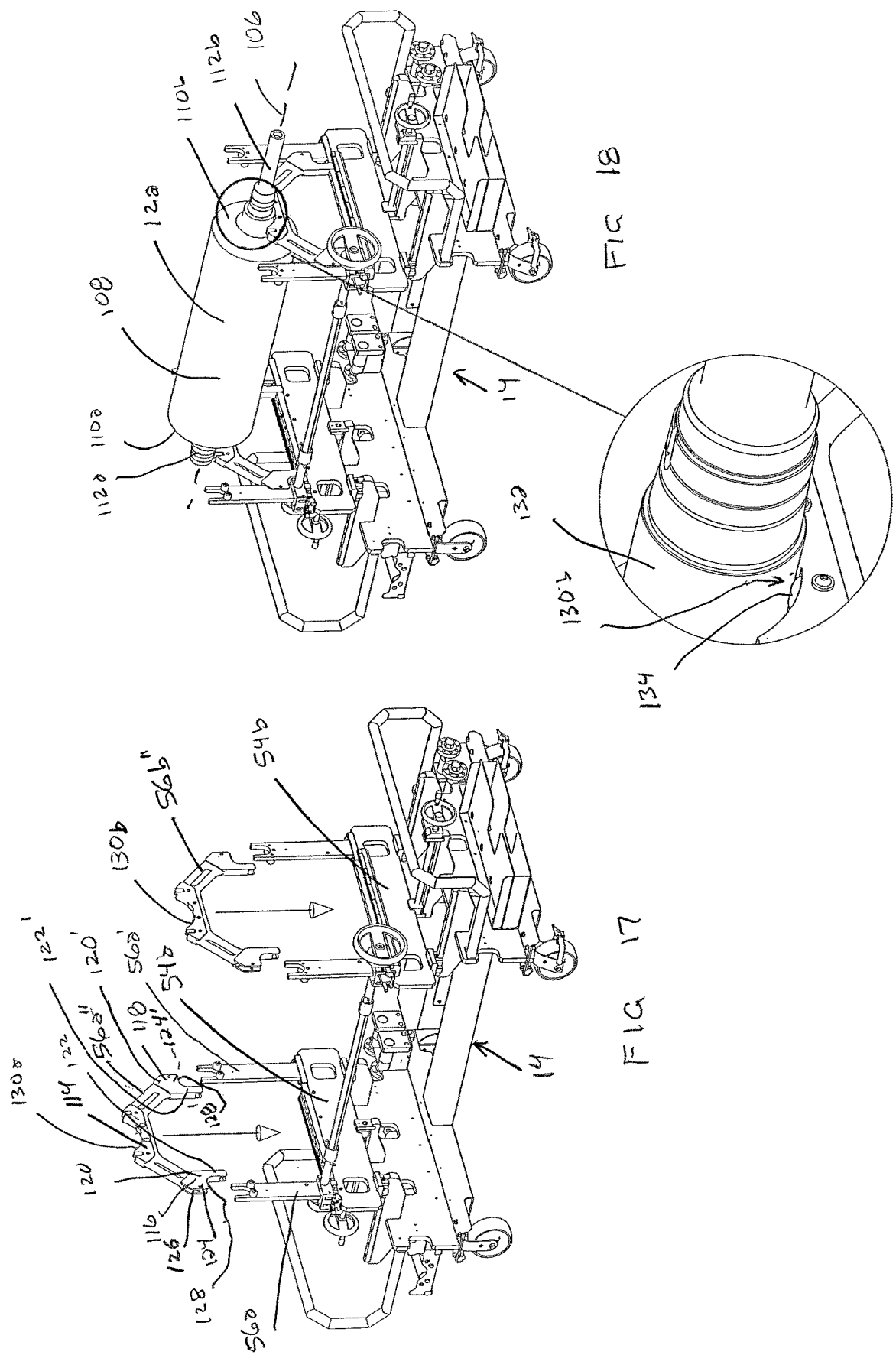

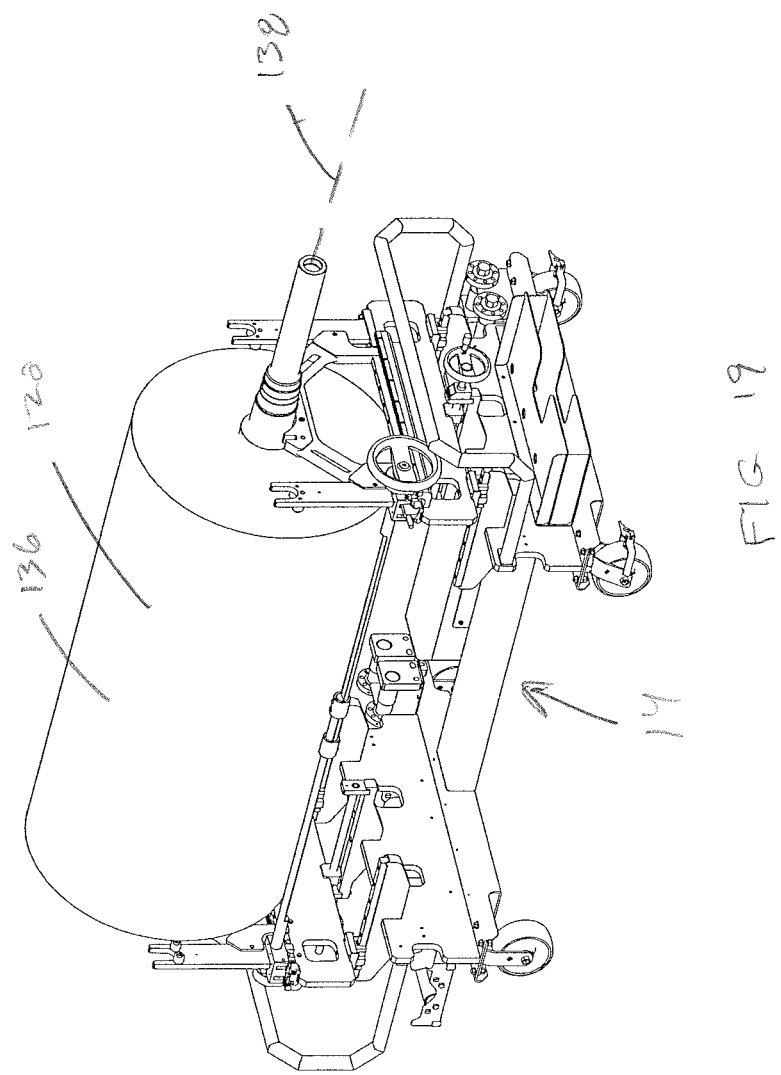

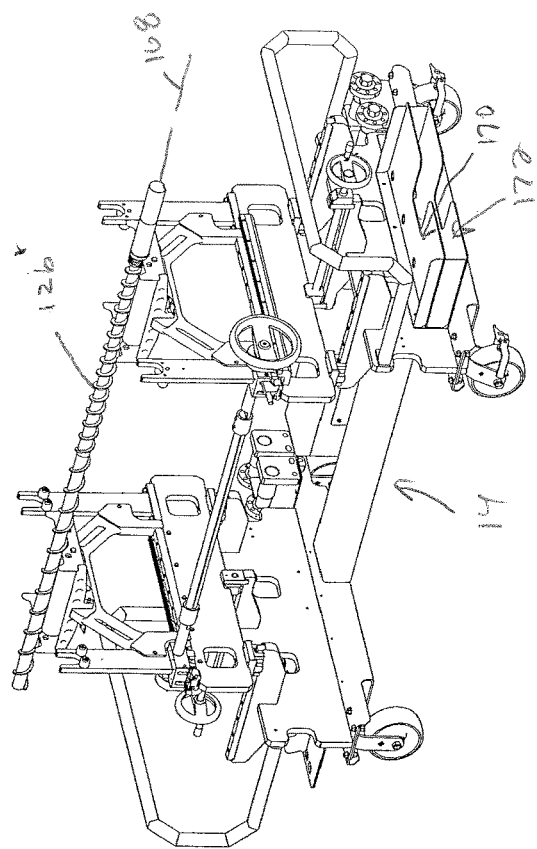
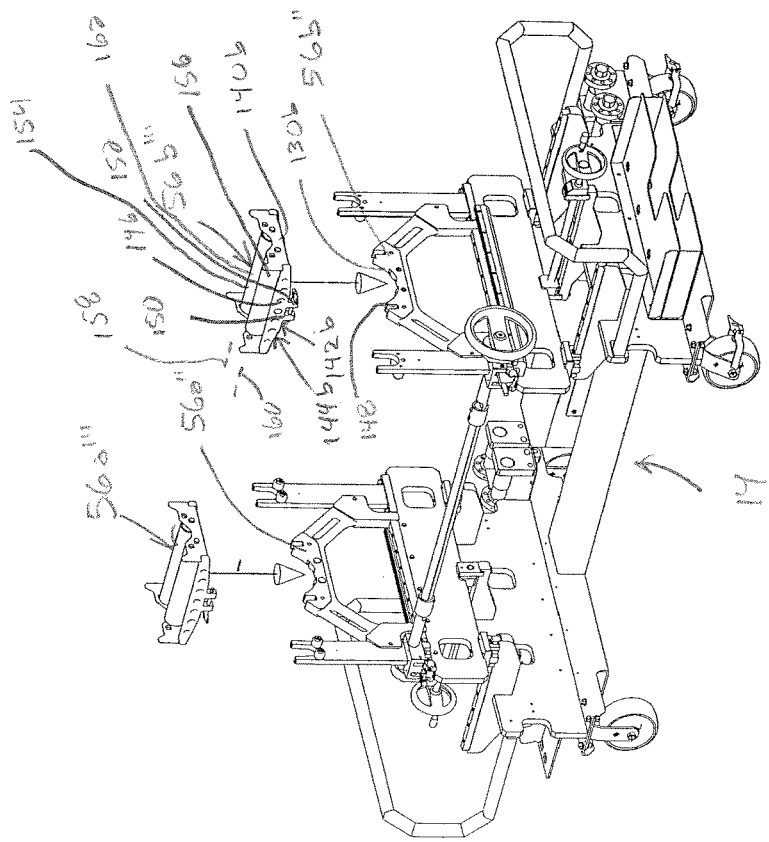

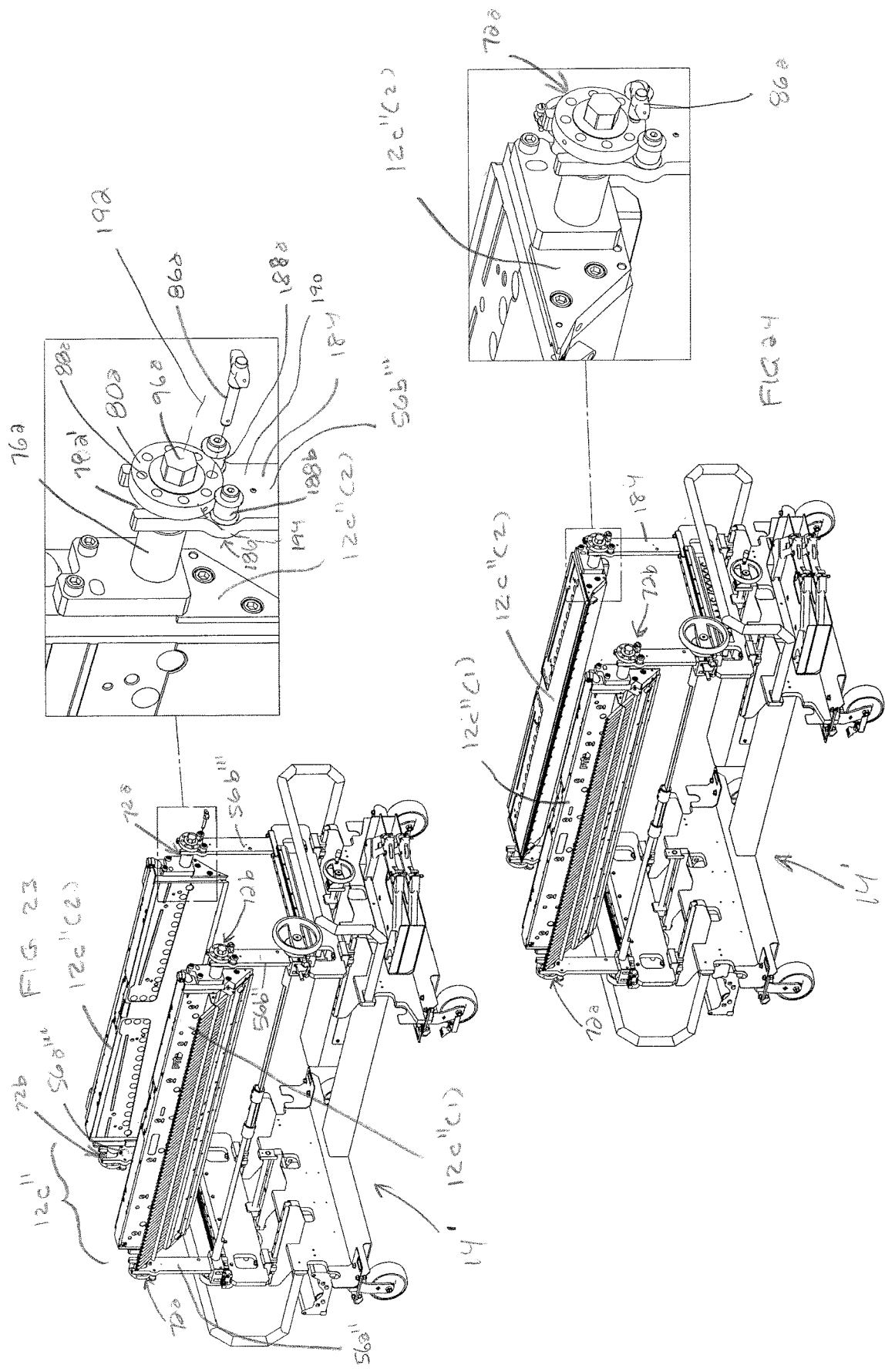

METHOD FOR HANDLING COMPONENTS OF A SHEET EXTRUSION SYSTEM

BACKGROUND OF THE INVENTION

Field of the Invention

This invention relates to sheet extrusion systems and, more particularly, to a method and apparatus for handling different components making up these systems to facilitate relocation, maintenance, and repair thereof.

Background Art

Myriad forms of sheet extrusion systems are currently in commercial use. These systems typically will have different stations performing different functions, with each station commonly made up of several large components that require routine maintenance and oftentimes must be repaired, replaced, or refurbished.

Upstream stations are configured to treat an incoming supply of material by heating the same and advancing the material in a flowable form to downstream stations at which there are delivery dies. Commonly, one or more spirally configured extrusion members will be operated to accumulate and advance the material as it is progressively heated to have a desired state for further processing.

At downstream stations, die components receive the molten material and deliver the same through a controlled output as at nip locations between cooperating rolls. The cooperating rolls form the material into a sheet, the thickness of which is controlled by spacing between cooperating paired rolls.

In further downstream stations, additional treatment of the continuously advancing sheet material may take place, including surface conditioning and controlled cooling thereof to prevent undesired warpage and other defects in the sheet that result in variations from a consistent desired final form.

Still further downstream stations draw off the completed sheet form that may be advanced for accumulation at a staging location. Additional rolls may be utilized to effect this accumulation.

The nature of these systems varies significantly in terms of the number of stations, the number of components at each station, the function of components, and the overall system length, depending upon a desired end product. For example, the system may be set up strictly to produce a sheet form or may incorporate intermediate forming structures, such as drums, whereby discrete parts, such as cups, plates, etc., may be produced.

Regardless of the precise configuration of the system and its length and complexity, installers and operators of such systems are typically required to handle a large number of different components that have significant volume and weight. Initially, at system setup, the different components must be moved to their installation location and incorporated into the system.

Periodically, components may have to be removed and staged at a location whereat they can be inspected, maintained, repaired, etc.

There currently exist stands that are designed to stage individual rollers to facilitate their handling. However, other components, such as extruder screws, die parts, etc., present a challenge to those that must handle them at the time of installation and through processes where they are separated to be inspected, repaired, maintained, or replaced. This is particularly true with components such as those making up dies, which are large, heavy, and awkward to reorient to allow access to all critical regions thereon.

Given that operating facilities at which these systems are provided are generally designed to maximize usage of space, makeshift staging areas for components may take up a significant amount of space and there may be inefficiencies in terms of how they are laid out. Those working on individual components may, in addition to taking up space, interfere with basic operation of the systems.

Existing systems for staging rollers have limitations in that they are generally designed for a single roll configuration. Thus, in a system that typically incorporates rolls of many different diameters and length, multiple carriages may be required to be on hand, taking up valuable space and creating storage issues when not in use.

Still further, when using these carriages, installers/maintenance people will commonly spread out a number of tools and accessories used to facilitate the process. This may pose a working hazard in the vicinity of the system while again competing for critical usable space.

Those in the sheet extrusion industry continue to seek out different structures and procedures to facilitate large component handling in a safe manner while efficiently utilizing available space.

SUMMARY OF THE INVENTION

In one form, the invention is directed to a method of handling components for a sheet extrusion system. The method includes the steps of: obtaining a carriage configured to support different components each making up a part of a sheet extrusion system; placing a first of the different components in a supported staging position on the carriage; performing an operation on the first of the different components in the supported staging position to at least one of: a) transport the first of the different components; b) perform a maintenance step on the first of the different components; c) repair the first of the different components; or d) set the first of the different components up for installation; separating the first of the different components from the supported staging position on the carriage; and reconfiguring the carriage to maintain a second of the different components, that is different than the first of the different components, in a supported staging position on the carriage wherein the second of the different components can be at least one of transported, maintained, repaired, or set up for installation.

In one form, the different components include at least one of: a) a roll that engages a surface of a sheet material during a sheet extrusion process; b) a feed screw that is turned around an axis to advance material used to form a sheet during a sheet extrusion process; and c) a die component used to controllably discharge a material used to form a sheet during a sheet extrusion process.

In one form, the first of the different components is a roll that engages a surface of a sheet material being formed. The roll has an axis, axially spaced first and second ends, and first and second shaft lengths. The step of placing the first of the different components in a supported staging position involves supporting the first and second shaft lengths respectively on spaced supports on the carriage.

In one form, the carriage has a main frame. The step of placing the first of the different components in a supported staging position involves supporting the first of the different components through spaced supports on the carriage. The step of reconfiguring the carriage involves moving at least one of the spaced supports relative to the main frame to at least one of: a) change a spacing between the spaced supports; and b) change a relationship between the first of the different components and the main frame with the first of the different components in its supported staging position.

In one form, the step of placing the first of the different components in a supported staging position involves supporting the first of the different components by first and second spaced supports on the carriage.

In one form, the step of reconfiguring the carriage involves placing first and second adaptor components/supports on the main frame. The method further includes the step of placing a second of the different components in a supported staging position on the carriage wherein the second of the different components is supported by the first and second adaptor components/supports.

In one form, the carriage has a subframe with spaced subframe parts with at least one of the spaced subframe parts movable relative to the other of the spaced subframe parts and the main frame. The first and second adaptor components/supports are supported one each respectively on the first and second subframe parts.

In one form, the method further includes the step of placing a second of the different components in a supported staging position on the carriage so that the first and second different components are in respective supported staging positions on the carriage at the same time.

In one form, the carriage has a main frame. The method further includes the step of effecting repositioning of one of the first and second different components relative to the other of the first and second different components and the main frame with the first and second different components in respective supported staging positions.

In one form, the first and second spaced supports are trunnion supports. The method further includes the step of turning the first of the different components in the supported staging position around an axis defined by the first and second trunnion supports.

In one form, the carriage has an indexing structure. The method further includes the step of turning the first of the different components in the supported staging position around the axis defined by the trunnion supports to an angular position and through the indexing structure releasably maintaining an angular position of the first of the different components from a selectable plurality of different angular positions.

In one form, the carriage has a main frame on which the first and second spaced supports are situated. The method further includes the step of guidingly moving at least one of the first and second spaced supports relative to the main frame.

In one form, the carriage has a first subframe. The method further includes the step of guidingly moving at least a part of the first subframe relative to the main frame to thereby reposition at least one of the first and second spaced supports relative to the main frame.

In one form, the carriage has a second subframe. The method further includes the step of guidingly moving at least a part of the second subframe relative to the first subframe to thereby reposition at least one of the first and second spaced supports relative to the main frame.

In one form, the carriage has a gauging system. The method further includes the step of identifying through the gauging system different positions of the at least one of the first and second spaced supports relative to the main frame to thereby facilitate consistent positioning of the at least one of the first and second spaced supports in one or more desired positions relative to the main frame.

In one form, at least one of the adaptor components/supports is configured to be releasably press fit into an operative position on the carriage.

In one form, the carriage is supported by at least one wheel. The method further includes the step of repositioning the carriage by rolling the at least one wheel against a subjacent surface.

In one form, the step of reconfiguring the apparatus involves placing third and fourth adaptor components/supports respectively on the first and second adaptor components/supports. The method further includes the step of placing one of the different components in a supported staging position on the carriage wherein the one of the different components is supported on the third and fourth adaptor components/supports.

In one form, the carriage has first and second spaced, dedicated, elongate graspable components. The step of repositioning the carriage involves repositioning the carriage through manipulation of at least one of the first and second spaced, dedicated, elongate, graspable components.

In one form, the carriage has at least one dedicated receptacle. The method further includes the step of storing at least one of the first and second adaptor components/supports in the at least one dedicated receptacle.

In one form, the invention is directed to a carriage as described above.

BRIEF DESCRIPTION OF THE DRAWINGS

FIG. 1 is a schematic representation of a sheet extrusion system having components that can be handled using the inventive carriage, as shown also in schematic form in FIG. 1;

FIG. 2 is a flow diagram representation of a method of handling components, each making up a part of a sheet extrusion system as in FIG. 1, according to the invention;

FIG. 3 is a perspective view of one exemplary form of carriage, as shown schematically in FIG. 1, in one configuration wherein spaced cooperating supports, for maintaining components in a supported staging position on the carriage, have a minimum spacing therebetween;

FIG. 4 is a view as in FIG. 3 wherein the spacing between the supports is maximized;

FIG. 5 is a view corresponding to that in FIG. 3 and highlighting details of a wheel supporting the carriage;

FIG. 6 is a perspective view of the carriage in FIGS. 3-5 with mounting adaptors attached to the spaced supports for maintaining multiple die components in supported staging positions;

FIG. 7 is a reduced perspective view of the carriage in FIGS. 3-6, in a state corresponding to that in FIG. 4, and highlighting details of an adjusting mechanism therefor;

FIG. 8 is a view corresponding to that in FIG. 7 wherein the carriage is in the FIG. 3 state;

FIG. 9 is a view of the carriage in the FIG. 7 state and highlighting details of storage receptacles on the carriage;

FIG. 12 is a view of the carriage as in FIG. 6 with spaced support pairs relatively moved from the FIG. 6 position and each pair supporting a die component;

FIG. 13 is a view of the carriage as in FIG. 12 and highlighting details on the carriage and interaction of the carriage with the die components;

FIG. 14 is a view of the carriage as in FIG. 13 and with the separate die components, in supported staging positions on the carriage, moved away from each other;

FIG. 15 is a view corresponding to that in FIG. 12 wherein the carriage is reconfigured for die components having a different dimension and shown in supported staging positions;

FIG. 16 is a view as in FIG. 15 wherein the die components are moved away from each other;

FIG. 17 is an exploded, perspective view of the carriage in the FIG. 16 configuration and with adaptor components/supports being installed thereon;

FIG. 18 is a view as in FIG. 17 wherein a roll/component is in a supported staging position on the installed adaptor components/supports;

FIG. 19 is a view as in FIG. 18 wherein a different configuration of roll is in a supported staging position on the carriage;

FIG. 20 is an exploded view of the carriage as in FIG. 18 and with additional adaptor components/supports;

FIG. 21 is a view as in FIG. 20 with the additional adaptor components/supports in place and a feed screw/component in a supported staging position;

FIG. 23 is a view of the carriage as in FIG. 14 with a modified form of mounting adaptors maintaining multiple die components in supported staging positions; and FIG. 24 is a view of the carriage in FIG. 23 with one of the die components moved to a different angular position.

DETAILED DESCRIPTION OF THE PREFERRED EMBODIMENT

Figure 11:
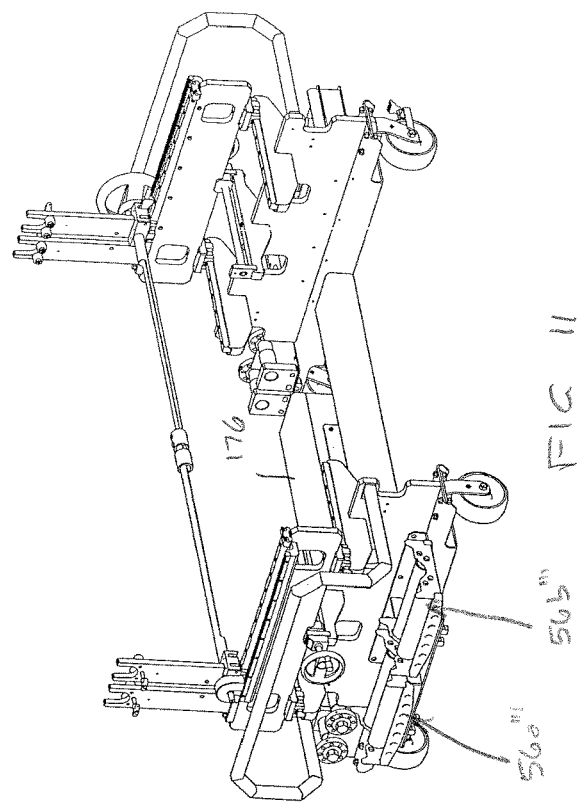
FIG. 11 is a view of the carriage in the state of FIG. 10 and from a different perspective.
Figure 10:
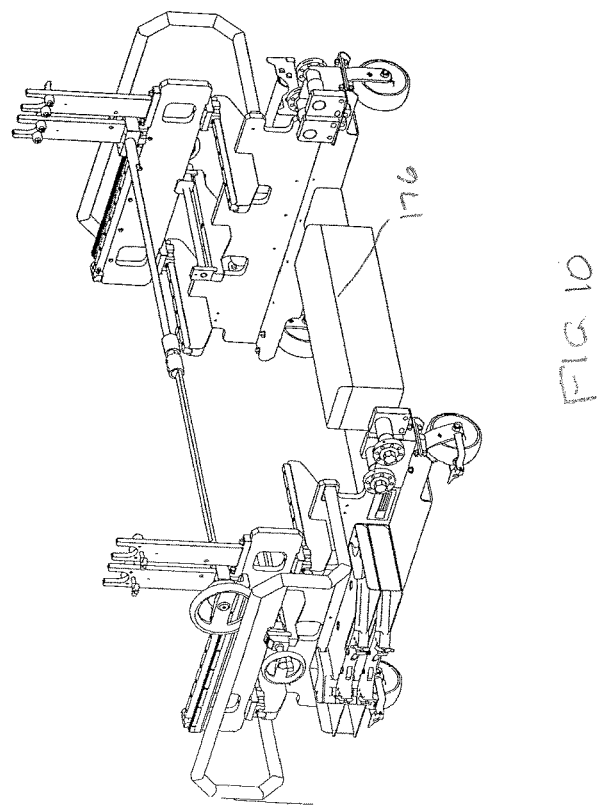
FIG. 10 is a view of the carriage in the FIG. 5 state and from a different perspective.

The present invention is directed generally to sheet extrusion systems, as shown schematically at 10 in FIG. 1. More particularly, the invention is concerned with handling of components 12, each making up a part of the sheet extrusion system.

The sheet extrusion system 10, and components 12 that are incorporated into the sheet extrusion system 10, are shown schematically since the precise form thereof is not critical to the present invention. Further, the schematic representation is intended to encompass virtually an unlimited number of different sheet extrusion system layouts and component variations incorporated thereinto.

Exemplary sheet extrusion systems 10 are shown in the assignee's U.S. Pat. Nos. 11,052,592; 10,406,738; 10,350,810; 10,071,517; 9,182,067; 9,139,393; 8,631,925; 8,342,118; 8,240,180; 8,152,509; 8,021,140; and 7,165,962, the disclosure of which is incorporated herein by reference. These systems are representative in nature only and should not be viewed in any way as limiting.

According to the invention, a carriage 14 is used in conjunction with the sheet extrusion system 10 and is designed to maintain different components 12 in a supported staging position. With the components 12 in the supported staging position on the carriage 14, different operations can be performed thereon. For example, but without limitation, the components 12 may be transported from one location to the next by guiding the carriage 14 over a subjacent support. With the components 12 in the supported staging position on the carriage 14, additional operations may be performed, such as, but not limited to, performing maintenance steps on the components 12, repairing the components 12, setting the components up for installation, etc. There is no limitation as to the operations that may be performed on the components 12 when in the supported staging position on the carriage 14.

A method of handling the components for a sheet extrusion system, according to the invention, is shown in flow diagram form in FIG. 2.

As shown at block 16, a carriage 14, configured to support different components each making up part of a sheet extrusion system, is obtained.

As shown at block 18, a first of the different components 12 is placed in a supported staging position on the carriage 14.

As shown at block 20, with the first component in the supported staging position, an operation is performed thereon as described above, which operations, as noted, are not intended to be all-inclusive of those contemplated.

As shown at block 22, the first component is separated from the supported staging position on the carriage 14.

As shown at block 24, the carriage 14 is reconfigured for a second component that is different than the first component.

It should be noted that multiple components may be placed on the same carriage 14 to be in a supported staging position at the same time. The multiple components 14 may be parts of another component or self-contained components.

An exemplary form of the carriage 14, and its manner of use, are shown in FIGS. 3-22. It should be understood that this carriage form is exemplary in nature only and should not be viewed as limiting.

The carriage 14 is shown herein to maintain three different, exemplary forms of components 12 in a supported staging position on the carriage 14.

In FIG. 18, the component 12a is in the form of a roll that engages a surface of a sheet material during a sheet extrusion process. In FIG. 19, a roll 12a' is shown with different dimensions—both in axial length and diameter.

Figure 22:
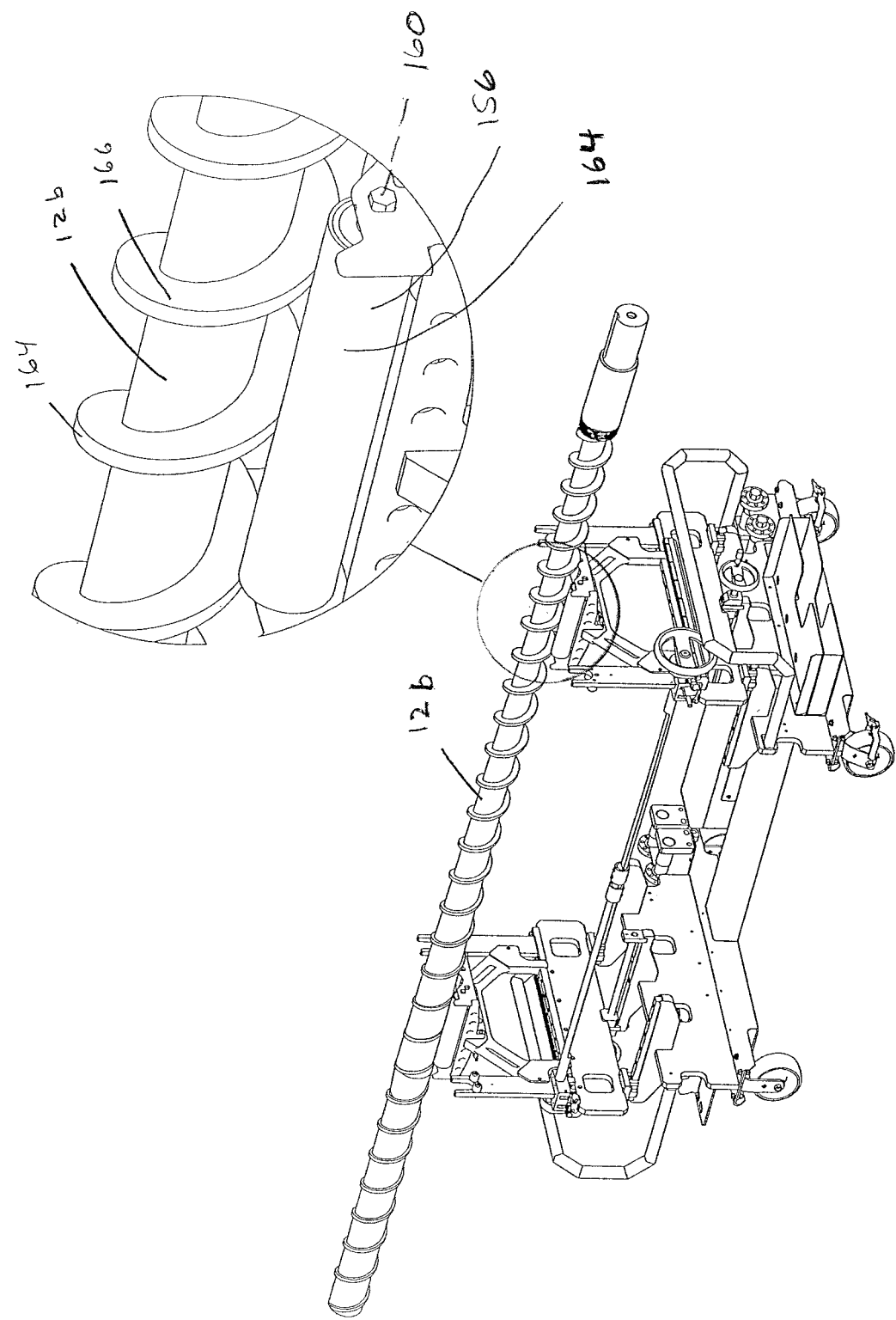
FIG. 22 is a view as in FIG. 21 and highlighting details of one of the adaptor components/supports and with a different size of feed screw/component in a supported staging position.

In FIGS. 21 and 22, components 12b, 12' are shown as different forms of a feed screw used on a single screw extruder. Components on a twin screw extruder might be placed individually in a similarly supported staging position on the carriage 14. In either form, the feed screw is designed to turn around an axis to advance material used to form a sheet during a sheet extrusion process.

As shown in FIGS. 15 and 16, a die component is shown at 12c that is used to controllably discharge a flowable material used to form a sheet during a sheet extrusion process. The die component 12c is made up of joinable die components/parts 12c(1) and 12c(2). With the die components/parts 12c(1) and 12c(2) in assembled relationship, as shown in FIG. 15, an elongate discharge opening 26 is defined.

In FIG. 16, the die components/parts 12c(1) and 12c(2) are in spaced relationship and each in a respective supported staging position on the carriage 14.

In FIGS. 12-14, a different form of die component 12c' is shown with corresponding die components/parts 12c'(1) and 12c'(2) in joined relationship in FIGS. 12 and 13, corresponding to the FIG. 15 relationship, and separated in FIG. 14, corresponding to the FIG. 16 relationship for the die component 12c.

The die components 12c, 12c' perform the same general function but are different in dimension, notably with the die component 12c' having a longer width W than the corresponding dimension of the die component 12c.

The carriage 14 consists of a main frame 28 supported by a pair of steerable wheels 30a, 30b, at one end 32 of the main frame 28, and a pair of fixed axis wheels 34 (one shown) at the opposite main frame end 36. The wheels 30, 34 cooperatively support the carriage 14 and allow the carriage 14 to move guidingly over a subjacent surface 38 as the wheels 30, 34 are rolled thereover.

The carriage 14 has first and second spaced, dedicated, elongate graspable components 40, 42, respectively at the main frame ends 32, 36. As depicted, each of the elongate graspable components 40, 42 extends generally orthogonally to a line extending between the ends 32, 36, as indicated by the double-headed arrow 44. For purposes of simplicity, the carriage 14 will be considered to have a length between the ends 32, 36 and a transverse width. There is no significance to the designations "length", "width", etc.

As depicted, the elongate graspable components 40, 42 each extends over a majority of the width of the carriage 14.

The elongate graspable component 40 is fixed on the frame through spaced arms 46a, 46b such that the elongate graspable component 40 is cantilever mounted to reside at or extend beyond the main frame end 32 to be readily grasped without interference from the other carriage components.

The elongate graspable component 42 is cantilever mounted in like fashion through arms 48a, 48b at the opposite main frame end 36.

By grasping one or both of the elongate graspable components 40, 42, one or more persons can conveniently exert forces upon the carriage 14 to guide movement thereof. The wheels 30a, 30b provide a steering capability and also incorporate conventional-type wheel locks 50 that can be readily engaged, to block turning of the wheels 30a, 30b, and released to allow rolling thereof. The locking capability avoids inadvertent movement of the carriage 14 particularly with a component in a supported staging position thereon.

The carriage 14 consists of a first subframe 52 mounted on the main frame 28. The first subframe 52 consists of first and second parts 54a, 54b, each movable guidingly relative to the main frame 28 along the line of the double-headed arrow 44.

Spaced supports 56a, 56b are mounted, one each on the subframe parts 54a, 54b, respectively.

A second subframe 58 consists of an elongate connector 59 and the supports 56a, 56b, with the connector 59 and supports 56a, 56b making up a unit that is movable guidingly relative to the first subframe 52 and additionally the main frame 28. The second subframe 58 permits a component in a supported staging position to be guidingly moved sideways relative to the main frame 28 and additionally allows multiple components to be placed in respective supported staging positions on the carriage 14 at the same time and moved relative to each other, as explained in detail below.

In the depicted form, each of the first subframe parts 54a, 54b is guided lengthwise relative to the main frame 28 through linear bearing guides. As seen in FIG. 3, there are two linear bearing guides 60a, 60b that guide the first subframe part 54a precisely back and forth along the line indicated by the double-headed arrow 44. A screw drive 62 with a rotary actuator 64a allows a user to turn the actuator 64a in opposite directions to thereby move the first subframe part 54a in opposite lengthwise directions, as desired. The actuator 64a, as all exemplary actuators disclosed herein, is in the form of a conventional ring shape with a projecting knob 66a for convenient hand engagement and turning.

The first subframe part 54b cooperates with the main frame 28 through a like arrangement of linear bearing guides 60c, 60d with the first subframe part 54b being movable through a screw drive 68 corresponding to the screw drive 62 controlled using an actuator 64b.

While both subframe parts 54a, 54b are movable relative to the main frame 28, in an alternative form, only one of the subframe parts 54a, 54b is required to be movable relative to the main frame 28 to perform the functions desired.

The second subframe 58 has telescoping parts 70a, 70b, making up the connector 59, that reposition to produce a combined length that either is shortened or lengthened depending upon the relative movement between the first subframe parts 54a, 54b.

In one exemplary process, the die component/part 12c'(1) will be arbitrarily designated a "first" component, with the spaced supports 54a, 54b similarly arbitrarily designated "first" and "second" supports, respectively.

As seen in FIGS. 6 and 12-14, the first and second supports 56a, 56b are modified to define trunnion supports. More specifically, mounting adaptors 72a, 72b are fixed respectively to opposite sides 74a, 74b of the die component/part 12c'(1).

With the mounting adaptor 72 fixed on the die component/part 12c'(1), cylindrical lengths 76a, 76b on the adaptors 72a, 72b can be directed into upwardly opening U-shaped seats 78a, 78b, respectively, on the first and second supports 56a, 56b, to thereby maintain the guide component/part 12c'(1) in its supported staging position on the carriage 14.

The spacing between the first and second supports 56a, 56b is selected so that indexing rings 80a, 80b on the adaptors 72a, 72b are in adjacent facing relationship with oppositely facing surfaces 82a, 82b, respectively on the first and second supports 56a, 56b. Lengthwise shifting of the component part 12c'(1) relative to the main frame 28, while in the supported staging position, is thereby confined.

The indexing rings 80a, 80b are part of indexing structures 84a, 84b on opposite sides of the die component/part 12c'(1). The indexing structures 84a, 84b are substantially the same and mirror images of each other. With the exemplary indexing structure 84a, a locking pin 86a can be directed through any of circumferentially spaced through openings 88a on the indexing ring 80a and into a complementary receptacle on the support 56a. Spaced bearings 92a, 92a' on the support 56a guide turning of the cylindrical length 76a. Like bearings 92b (one shown) support the cylindrical length 76b in like fashion.

With the die component/part 12c'(1) in its supported staging position on the carriage 14, the cylindrical lengths 76a, 76b support the component/part 12c'(1) to permit guided movement of the die component/part 12c'(1) around an axis 94. By turning the die component/part 12c'(1) around the axis 94, different regions thereof can be strategically placed to facilitate operations that may be performed thereon. When a desired orientation is arrived at, the pin 86a is directed through an opening 88a that registers with the receptacle on the support 56a to fix the angular position of the die component/part 12c'(1).

A similar pin 86b is inserted on the indexing structure 84b to more positively fix the selected angular position for the die component/part 12c'(1).

To facilitate angular reorientation of the die component/part 12c'(1), turning fittings 96b (one shown on the indexing structure 84b) have polygonally-shaped surfaces to accommodate an appropriate turning tool.

The second support 56b has a mirror image arrangement of the posts 92a, 92a'.

As noted, if the carriage 14 is designed to support only a single component in only a single supported staging position, the need for the second subframe 58 would not exist.

Alternatively, a second subframe, similar to the subframe 58, also with a side-to-side adjustment capability, might be incorporated.

To support the die component/part 12c'(2), an additional pair of supports 56a', 56b' is provided to cooperate with the die component/part 12c'(2) in substantially the same manner as the supports 56a, 56b cooperate with the die support component/part 12c'(1).

Linear bearing guides 98a, 98b cooperate between the supports 56a, 56b and the subframe parts 54a, 54b to guide the second subframe 58 with the supports 56a, 56b guidingly in a side-to-side direction, as indicated by the double-headed arrow 99. As seen in FIG. 6, with the supports 56a, 56b moved to a maximum widthwise spacing from the supports 56a', 56b', a hooked end 100 of a locking bar 100 shifts downwardly to maintain a maximum widthwise spacing between the supports 56a, 56b and 56a', 56b' and avoid inadvertent lateral shifting of the supports 56a, 56b. The hooked end 100 can be raised through a graspable post 101 to thereafter permit the supports 56a, 56b to be controllably moved laterally towards the supports 56a', 56b'.

An actuator 102, having a grippable ring shape, is turned to operate a screw drive to move the supports 56a, 56b on the subframe 58 in a side-to-side direction, depending upon the direction of turning of the actuator 102 around its axis 104. With all drives, rack and pinion structures might be used. However, this is only an exemplary mechanism, selected from others currently available, that provides precisely controllable adjustment.

With the die components/parts 12c'(1), 12c'(2) in their respective supported staging positions, as in FIGS. 12-14, through operation of the actuator 102, the operator can selectively shift the die component/part 12c'(1) laterally to place the die components/parts 12c'(1) and 12c'(2) in different relative lateral positions, ranging from that in FIG. 13, wherein they reside essentially in a matched assembled relationship, and that in FIG. 14, where they are moved a maximum distance laterally away from each other.

With the depicted structure, the supports 56a, 56b are movable relative to each other along the line 44, to change the spacing therebetween, through movement of at least one of the subframe parts 54a, 54b relative to the main frame 28. The telescoping connection on the second subframe 58 accommodates this movement.

At the same time, the supports 56a, 56b are movable relative to the main frame 28 in a transverse direction indicated by the double-headed arrow 100.

By utilizing this adjusting capability, the carriage 14 can be reconfigured to accommodate the components/parts 12c(1), 12c(2), in FIGS. 15 and 16, that have a narrower width than the die components/parts 12c'(1) and 12c'(2). The cooperation between the carriage 14 and the die components/parts 12c(1) and 12c(2) is substantially the same as that for the die components/parts 12c'(1) and 12c'(2).

In this case, the reconfiguration of the carriage 14 required to accommodate the different components involves repositioning of the supports 56a, 56b relative to each other and the main frame. In other words, the component(s) in the supported staging position can be separated for making the reconfiguration to accommodate a different component.

As shown in FIGS. 17-19, the carriage 14 is reconfigurable to accommodate rolls 12a, 12a', each designed to engage a surface of a sheet material being formed.

The exemplary roll/component 12a has an axis 106 about which the roll 12a is turned to cause a peripheral cylindrical surface 108 thereon to contact a sheet during the formation process. The roll/component 12a has axially spaced first and second ends 110a, 110b and projecting first and second shaft lengths 112a, 112b, respectively at the first and second ends 110a, 110b.

The carriage 14 is reconfigured from the previously described state by utilizing adaptor components/supports 56a", 56b". The adaptor components/supports 56a", 56b" are respectively mounted, one each on the subframe parts 54a, 54b, to move as a unit therewith.

The adaptor components/supports 56a", 56b" have substantially the same configuration and are joined to their respective subframe parts 54a, 54b in the same fashion.

The representative adaptor component/support 56a" has an inverted U-shaped body 114 with spaced legs 116, 118. The leg 116 has a coupling part 120 with a longer bifurcated leg portion 122 that is directed downwardly to straddle the upper edge of the subframe part 54a. The other leg portion 124 of the "L" has spaced walls defining a guide slot 126 which accommodates a thickness of the support 56a. A downwardly facing wall surface 128 is defined at the bottom of the leg portion 124.

The leg 118 has a similar coupling component 120' that is a mirror image of the coupling component 120.

To operatively position the adaptor component/support 56a", the coupling components 120, 120' are aligned one each with the supports 56a, 56a' and lowered whereby the supports 56a, 56a' are guided in translation downwardly in the slots 124, 124' until wall surfaces 120a, 120a' abut to the top of the subframe part 54a. The leg portions 122, 122' straddle the subframe part 54a at spaced locations whereby the adaptor component/support 56a" is stably supported consistently in the same operative position.

The adaptor component/support 56b" is assembled in the same fashion to the subframe part 54b.

The adaptor components/supports 56a", 56b" respectively define concave upwardly opening seats 130a, 130b that are complementary in shape to surface portions 132 (one shown) on the shaft lengths 112a, 112b.

As depicted in FIG. 18, a plurality of roller bearings 134 (one shown) are placed in the seats 130 to cooperatively support the shaft lengths 112 and facilitate guided turning of the roll/component 12a around the axis 106 while in the supported staging position on the carriage 14.

The ability to press fit the adaptor components/supports 56a", 56b" into an operative position on the carriage facilitates reconfiguration of the carriage 14 to accommodate different components. With the earlier described configuration desired, the adaptor components/supports 56a", 56b" can be simply drawn away from the carriage 14 in an upward direction to be fully separated therefrom.

As depicted, the adaptor components/supports 56a", 56b" are spaced from each other to reside one each adjacent the roll/component ends 110a, 110b, thereby to confine shifting of the roll along its axis 106 relative to the carriage 14.

The adaptor components/supports 56a", 56b" have a substantial vertical extent that allows the roll/component 12a', shown in FIG. 19 and having a substantially greater diameter, to be maintained in a supported staging position on the carriage 14 so that a peripheral sheet engaging surface 136 on the roll/component 12a' is spaced above all parts of the carriage 14 to allow the roll/component 12a' to be supported in the same manner as the roll/component 12a while being free to turn around its axis 138.

In FIGS. 20-22, the carriage 14 is shown further reconfigured to accommodate the aforementioned feed screws/components 12b, 12b'. Additional adaptor components/supports, arbitrarily identified as "third" and "fourth" adaptor components/supports 56*a*''', 56*b*''' are press fit, one each, into an operative position upon the adaptor components/supports 56*a*'', 56*b*'', respectively.

The exemplary adaptor component/support 56*b*'' has a frame 140*b* with an underside 142*b* that conforms nominally to the shape of the seat 130*b* on the adaptor component/support 56*b*''.

A coupler 144*b* is provided on one side of the frame 140*b*, with a similar coupler (not shown) at the opposite side thereof. The coupler 144*b* consists of a wall 146 with a thickness that can be directed into an upwardly opening slot 148 on the adaptor component/support 56*b*''. With the wall 146 directed into the slot 148, the base of the slot 148 abuts to the top of the adaptor component/support 56*b*''. Spaced wall portions 150, 152 straddle the thickness of the adaptor component/support 56*b*''.

With the couplers 144 on the opposite sides of the frame 140*b* engaged, the frame 140*b* is stably supported and positively keyed in a consistent position relative to the adaptor component/support 56*b*''.

The frame 140*b* supports a pair of cylindrical rollers 154, 156 for turning around spaced, parallel axes 158, 160. Peripheral surfaces 162, 164 cooperatively cradle and support a coincident length of the feed screw/component 12*b*. More specifically, a peripheral edge 164 on a spiral flight 166 on the feed screw/component 12*b* bears against the surfaces 162, 164. As a force is applied to the feed screw/component 12*b* to turn the same around its lengthwise axis 168, the rollers 154, 156 turn to facilitate guided angular repositioning of the feed screw/component 12*b*.

The feed screw/component 12*b* bridges the adaptor component/supports 56*a*'', 56*b*'' which cooperate therewith in like fashion. The feed screw/component 12*b* is thus stably maintained in this supported staging position and is readily repositioned to facilitate operation thereon.

The feed screw/component 12*b*', which has a smaller diameter than the feed screw 12*b*, cooperates with the components/supports 56*a*'', 56*b*'' in substantially the same manner. The depicted design can accommodate a range of feed screw diameters that may be larger or smaller than those shown.

For additional convenience, and to create a compact design, the carriage 14 has a least one dedicated receptacle for storing one or more of the adaptor components/supports.

In the exemplary form, two separate dedicated receptacles 170, 172 are defined at the main frame end 32 under the graspable component 42. Each of the receptacles 170, 172 is nominally matched in shape to the adaptor components/supports 56*a*'', 56*b*'', which can be translated, one each, thereinto, as shown in FIGS. 5 and 6.

As shown in FIG. 4, a gauging system at 174 is optionally incorporated to quantify relative positioning of, in this case, the associated supports 56*a*, 56*b* relative to each other, the subframe parts 54*a*, 54*b*, and the main frame 28. This allows the carriage 14 to be preset to accommodate specific components and component dimensions whereby an operator is not required to make adjustments while maneuvering the particular component into its supported staging position.

The gauging system 174 can be incorporated to quantify relative positions of any of the relatively movable components making up the carriage 14 with the arrangement of FIG. 4 being representative in nature only. It is desirable that positionable feedback be given for at least the subframe parts 54*a*, 54*b*. A digital feedback is desirable.

Those skilled in this art could devise myriad different structures to identify relative positions and facilitate relative movement between parts to arrive at an optimal presettable configuration matched to a component that is to be staged on the carriage 14.

As a further convenience to the operators, an optional toolbox 176 is supported on the carriage 15, to be movable therewith, and accommodates tools and/or parts commonly utilized by those performing operations on the various components 12.

As an additional convenience to the operator, receptacles 178 are provided on the main frame, as shown in FIG. 6, to accommodate the mounting adaptors 72, as shown in FIG. 5, when not in use.

Provision is also made at the main frame end 36 to stage the adaptor components/supports 56*a*''', 56*b*''' when not in use, as shown in exemplary FIGS. 3-5 and 11.

In a further alternative design, an adjusting mechanism 180, as shown schematically in FIG. 4, connects between the subframe parts 54*a*, 54*b* and is operated by a drive 182 to change the spacing between the subframe parts 54*a*, 54*b*. With a screw operated drive 182, thread direction can be controlled so that movement of a single actuator 64' simultaneously moves the subframe parts 54*a*, 54*b* selectively towards and away from each other, depending upon the turning direction of the actuator 64'.

In FIGS. 23 and 24, a modified form of carriage 14' is shown with the aforementioned mounting adaptors operatively positioned on modified forms of supports 56*a*'', 56*a*''' 56*b*'', 56*b*'''. One adaptor 72*a*, 72*b* is provided at each end of a die component/part 12*c*''(1) and a die component/part 12*c*''(2), which die components/parts 12*c*''(1), 12*c*''(2) together make up a die component 12*c*''.

Each of the mounting adaptors 72*a*, 72*b* cooperates with a respective support 56*a*'', 56*a*''' 56*b*'', 56*b*''' in like fashion. A representative connection between the support 56*1f* and mounting adaptor 72*a* is shown in detail.

The support 56*b*''' has a body 184 defining a seat 78*a*' and a locally widened region at 186 to accommodate bearings 188*a*, 188*b* mounted at a surface 190 facing oppositely to the die component/part 12*c*''(2) in the supported staging position on the carriage 14' with the cylindrical length 76*a* in the seat 78*a*'. The bearings 188*a*, 188*b* bear against the indexing ring 80*a* to thereby guide turning of the die component/part 12*c*''(2) around the axis 192.

One of the pins 86*a* is directed through one of the openings 88*a* that registers with an opening 194 in the support body 184 to fix an angular position of the die component/part 12*c*''(2). A turning fitting 96*a* is engageable by a turning tool to facilitate turning of the die component/part 12*c*''(2).

As seen in FIG. 23, with the die component part 12*c*''(2) in the depicted angular orientation, the turning fitting 96*a* can be engaged to counter any torque that may be produced by the die component/part 12*c*''(2) in an unbalanced orientation upon withdrawal of the pin 86*a*. The die component/part 12*c*''(2) can then be angularly repositioned, as in FIG. 24, whereupon the pin 86*a* can be reinserted.

While any type of "pin" structure might be utilized, including one with threads, the ability to slide the pin 86*a* in and out eliminates steps requiring tools.

The other mounting adaptors 72*a*, 72*b* are joined to respective die components/parts 12*c*''(1), 12*c*''(2) in like fashion. The pin 86*a* is not required at both sides of the die components/parts 12*c*''(1), 12*c*''(2) but is desirable for a more positive securement of a die component/part that may have an uneven weight distribution that generates torque when in a desired angular orientation in the supported staging position.

All critical parts can be plated and powder coated to minimize wear and corrosion to provide an extended useful life for the carriage 14.

The foregoing disclosure of specific embodiments is intended to be illustrative of the broad concepts comprehended by the invention.

The invention claimed is:

1. A method of handling components for a sheet extrusion system, the method comprising the steps of:
    obtaining a carriage configured to support different components each making up a part of a sheet extrusion system, a first of the different components having a lengthwise axis;
    placing the first of the different components in a supported staging position on the carriage wherein the first of the different components is supported on spaced supports on the carriage;
    performing an operation on the first of the different components in the supported staging position to at least one of: a) transport the first of the different components; b) perform a maintenance step on the first of the different components; c) repair the first of the different components; or d) set the first of the different components up for installation;
    separating the first of the different components from the supported staging position on the carriage;
    reconfiguring the carriage to maintain a second of the different components, that is different than the first of the different components, in a supported staging position on the carriage wherein the second of the different components can be at least one of transported, maintained, repaired, or set up for installation; and
    said method further comprising the step of guidingly turning the first of the different components around the lengthwise axis of the first of the different components with the first of the different components in the supported staging position for the first of the different component.

2. The method of handling components for a sheet extrusion system according to claim 1 wherein the different components comprise at least one of: a) a roll that engages a surface of a sheet material during a sheet extrusion process; b) a feed screw that is turned around an axis to advance material used to form a sheet during a sheet extrusion process; and c) a die component used to controllably discharge a material used to form a sheet during a sheet extrusion process.

3. The method of handling components for a sheet extrusion system according to claim 2 wherein the first of the different components is a roll that engages a surface of a sheet material being formed, the roll having first and second spaced shaft lengths respectively at the first and second roll ends, and the step of placing the first of the different components in the supported staging position for the first of the different components comprises supporting the first and second spaced shaft lengths one each on the spaced supports on the carriage.

4. The method of handling components for a sheet extrusion system according to claim 2 wherein the carriage comprises a main frame and the step of reconfiguring the carriage comprises guidingly moving at least one of the spaced supports in a predetermined path relative to the main frame to at least one of: a) change a spacing between the spaced supports; and b) change a relationship between the first of the different components and the main frame with the first of the different components in the supported staging position for the first of the different components.

5. The method of handling components for a sheet extrusion system according to claim 4 wherein the step of guidingly moving at least one of the spaced supports relative to the main frame comprises guidingly moving the at least one of the spaced supports relative to the main frame using linear guides.

6. The method of handling components for a sheet extrusion system according to claim 1 wherein the step of placing the first of the different components in the supported staging position for the first of the different components comprises supporting the first of the different components against upwardly opening U-shaped seats on the spaced supports on the carriage.

7. The method of handling components for a sheet extrusion system according to claim 6 wherein the step of reconfiguring the carriage comprises placing first and second adaptor components/supports on the main frame, the method further comprising the step of placing a second of the different components in a supported staging position on the carriage wherein the second of the different components is supported by the first and second adaptor components/supports.

8. The method of handling components for a sheet extrusion system according to claim 6 wherein the carriage comprises a subframe with spaced subframe parts with at least one of the spaced subframe parts movable using linear guides relative to the other of the spaced subframe parts and the main frame and the first and second adaptor components/supports are supported one each respectively on the first and second subframe parts.

9. The method of handling components for a sheet extrusion system according to claim 7 wherein at least one of the first and second adaptor components/supports is configured to be releasably press fit into a same operative position on the carriage.

10. The method of handling components for a sheet extrusion system according to claim 7 wherein the step of reconfiguring the apparatus comprises placing third and fourth adaptor components/supports respectively on the first and second adaptor components/supports, the method further comprising a step of placing one of the different components in a supported staging position on the carriage wherein the one of the different components is supported on the third and fourth adaptor components/supports.

11. The method of handling components each making up a part of a sheet extrusion system according to claim 7 wherein the carriage has at least one dedicated receptacle, the method further comprising a step of storing at least one of the first and second adaptor components/supports in the at least one dedicated receptacle.

12. The method of handling components for a sheet extrusion system according to claim 6 wherein the carriage comprises a main frame on which the first and second spaced supports are situated and the method further comprising a step of guidingly moving at least one of the first and second spaced supports through linear guides relative to the main frame.

13. The method of handling components for a sheet extrusion system according to claim 12 wherein the carriage comprises a first subframe and the method further comprising a step of guidingly moving at least a part of the first subframe relative to the main frame to thereby reposition at least one of the first and second spaced supports relative to the main frame.

14. The method of handling components for a sheet extrusion system according to claim 13 wherein the carriage comprises a second subframe and the method further comprising a step of guidingly moving at least a part of the second subframe relative to the first subframe to thereby reposition at least one of the first and second spaced supports relative to the main frame.

15. The method of handling components for a sheet extrusion system according to claim 13 wherein the carriage further comprises a gauging system and the method further comprising a step of identifying through the gauging system different positions of the at least one of the first and second spaced supports relative to the main frame to thereby facilitate consistent positioning of the at least one of the first and second spaced supports in one or more desired positions relative to the main frame.

16. The method of handling components for a sheet extrusion system according to claim 1 wherein the first and second different components are in respective supported staging positions on the carriage at the same time.

17. The method of handling components for a sheet extrusion system according to claim 16 wherein the carriage comprises a main frame, the method further comprising a step of effecting guided repositioning of one of the first and second different components relative to the other of the first and second different components and the main frame with the first and second different components in respective supported staging positions.

18. The method of handling components for a sheet extrusion system according to claim 1 wherein the carriage is supported by at least one wheel, the method further comprising a step of repositioning the carriage by rolling the at least one wheel against a subjacent surface.

19. The method of handling components each making up a part of a sheet extrusion system according to claim 18 wherein the carriage has first and second spaced, dedicated, elongate graspable components and the step of repositioning the carriage comprises repositioning the carriage through manipulation of at least one of the first and second spaced, dedicated, elongate, graspable components.

20. A method of handling components for a sheet extrusion system, the method comprising the steps of:
obtaining a carriage configured to support different components each making up a part of a sheet extrusion system;
placing a first of the different components in a supported staging position on the carriage;
performing an operation on the first of the different components in the supported staging position to at least one of: a) transport the first of the different components; b) perform a maintenance step on the first of the different components; c) repair the first of the different components; or d) set the first of the different components up for installation;
separating the first of the different components from the supported staging position on the carriage; and
reconfiguring the carriage to maintain a second of the different components, that is different than the first of the different components, in a supported staging position on the carriage wherein the second of the different components can be at least one of transported, maintained, repaired, or set up for installation,
wherein the step of placing the first of the different components in the supported staging position for the first of the different components comprises supporting the first of the different components by first and second spaced supports on the carriage,
wherein the first and second spaced supports are trunnion supports, the method further comprising the step of turning the first of the different components in the supported staging position for the first of the different components around an axis defined by the first and second trunnion supports.

21. The method of handling components for a sheet extrusion system according to claim 20 wherein the carriage further comprises an indexing structure, the method further comprising the step of turning the first of the different components in the supported staging position around the axis defined by the trunnion supports to an angular position and through the indexing structure releasably maintaining an angular position of the first of the different components from a selectable plurality of different angular positions.

22. A method of handling components for a sheet extrusion system, the method comprising the steps of:
obtaining a carriage configured to support different components each making up a part of a sheet extrusion system;
placing a first of the different components in a supported staging position on the carriage;
performing an operation on the first of the different components in the supported staging position to at least one of: a) transport the first of the different components; b) perform a maintenance step on the first of the different components; c) repair the first of the different components; or d) set the first of the different components up for installation;
separating the first of the different components from the supported staging position on the carriage; and
reconfiguring the carriage to maintain a second of the different components, that is different than the first of the different components, in a supported staging position on the carriage wherein the second of the different components can be at least one of transported, maintained, repaired, or set up for installation,
wherein the carriage is configured to guide the first of the different components in the supported staging portion for the first of the different components guidingly in movement relative to the carriage around an axis.

23. A method of handling components for a sheet extrusion system, the method comprising the steps of:
obtaining a carriage configured to support different components each making up a part of a sheet extrusion system;
placing a first of the different components in a supported staging position on the carriage;
performing an operation on the first of the different components in the supported staging position to at least one of: a) transport the first of the different components; b) perform a maintenance step on the first of the different components; c) repair the first of the different components; or d) set the first of the different components up for installation;
separating the first of the different components from the supported staging position on the carriage; and
reconfiguring the carriage to maintain a second of the different components, that is different than the first of the different components, in a supported staging position on the carriage wherein the second of the different components can be at least one of transported, maintained, repaired, or set up for installation,
wherein the different components comprise at least one of: a) a roll that engages a surface of a sheet material during a sheet extrusion process; b) a feed screw that is turned around an axis to advance material used to form a sheet during a sheet extrusion process; and c) a die component used to controllably discharge a material used to form a sheet during a sheet extrusion process, wherein the carriage is configured to guide the first of the different components in the predetermined supported staging position for the first of the different components guidingly in movement relative to the carriage around an axis.

24. A method of handling components for a sheet extrusion system, the method comprising the steps of:
   obtaining a carriage configured to support different components on spaced supports on the carriage, the different components each making up a part of a sheet extrusion system,
   a first of the different components having a lengthwise axis;
   placing the first of the different components in a supported staging position on the carriage wherein the first of the different components is supported on upwardly opening U-shaped seats on the spaced supports;
   performing an operation on the first of the different components in the supported staging position to at least one of: a) transport the first of the different components; b) perform a maintenance step on the first of the different components; c) repair the first of the different components; or d) set the first of the different components up for installation;
   separating the first of the different components from the supported staging position on the carriage; and
   reconfiguring the carriage to maintain a second of the different components, that is different than the first of the different components, in a supported staging position on the carriage wherein the second of the different components can be at least one of transported, maintained, repaired, or set up for installation.

25. The method of handling components for a sheet extrusion system according to claim 24 wherein the different components comprise at least one of: a) a roll that engages a surface of a sheet material during a sheet extrusion process; b) a feed screw that is turned around an axis to advance material used to form a sheet during a sheet extrusion process; and c) a die component used to controllably discharge a material used to form a sheet during a sheet extrusion process.

26. The method of handling components for a sheet extrusion system according to claim 24 further comprising a step of guidingly turning the first of the different components around a fixed axis that is parallel to the lengthwise axis of the first of the different components with the first of the different components in the supported staging position.

27. A method of handling components for a sheet extrusion system, the method comprising the steps of:
   obtaining a carriage configured to support different components each making up a part of a sheet extrusion system;
   placing a first of the different components on spaced supports on the carriage whereby the first of the different components is in a supported staging position on the carriage;
   performing an operation on the first of the different components in the supported staging position to at least one of: a) transport the first of the different components; b) perform a maintenance step on the first of the different components; c) repair the first of the different components; or d) set the first of the different components up for installation;
   separating the first of the different components from the predetermined supported staging position on the carriage; and
   reconfiguring the carriage to maintain a second of the different components, that is different than the first of the different components, in a supported staging position on spaced supports on the carriage wherein the second of the different components can be at least one of transported, maintained, repaired, or set up for installation,
   wherein the carriage comprises a main frame and a subframe on which the spaced supports are located,
   wherein the step of reconfiguring the carriage comprises moving at least a part of the subframe relative to the main frame using at least one linear guides.

* * * * *

UNITED STATES PATENT AND TRADEMARK OFFICE
CERTIFICATE OF CORRECTION

PATENT NO. : 12,296,367 B2
APPLICATION NO. : 17/899906
DATED : May 13, 2025
INVENTOR(S) : Dana R. Hanson and Ryan E. Leopold It is certified that error appears in the above-identified patent and that said Letters Patent is hereby corrected as shown below:

In the Claims

Claim 4 should read:
4. The method of handling components for a sheet extrusion system according to claim 2 wherein the carriage comprises a main frame and the step of reconfiguring the carriage comprises guidingly moving at least one of the spaced supports relative to the main frame to at least one of: a) change a spacing between the spaced supports; and b) change a relationship between the first of the different components and the main frame with the first of the different components in the supported staging position for the first of the different components.

Claim 8 should read:
8. The method of handling components for a sheet extrusion system according to claim 7 wherein the carriage comprises a subframe with spaced subframe parts with at least one of the spaced subframe parts movable using linear guides relative to the other of the spaced subframe parts and the main frame and the first and second adaptor components/supports are supported one each respectively on the first and second subframe parts.

Claim 22 should read:
22. A method of handling components for a sheet extrusion system, the method comprising the steps of:
    obtaining a carriage configured to support different components each making up a part of a sheet extrusion system;
    placing a first of the different components in a supported staging position on the carriage;
    performing an operation on the first of the different components in the supported staging position to at least one of: a) transport the first of the different components; b) perform a maintenance step on the first of the different components; c) repair the first of the different components; or d) set the first of the different components up for installation;
    separating the first of the different components from the supported staging position on the carriage; and Signed and Sealed this
Eighth Day of July, 2025

Coke Morgan Stewart
*Acting Director of the United States Patent and Trademark Office* reconfiguring the carriage to maintain a second of the different components, that is different than the first of the different components, in a supported staging position on the carriage wherein the second of the different components can be at least one of transported, maintained, repaired, or set up for installation, wherein the carriage is configured to guide the first of the different components in the supported staging position for the first of the different components guidingly in movement relative to the carriage around an axis.